United States Patent [19]

Adams, Jr. et al.

[11] 4,275,440
[45] Jun. 23, 1981

[54] I/O INTERRUPT SEQUENCING FOR REAL TIME AND BURST MODE DEVICES

[75] Inventors: Robert L. Adams, Jr., Kingston; Carl H. Grant, Woodstock; Karl W. Stevens, Saugerties, all of N.Y.

[73] Assignee: International Business Machines Corporation, Armonk, N.Y.

[21] Appl. No.: 948,070

[22] Filed: Oct. 2, 1978

[51] Int. Cl.³ .............................................. G06F 3/00
[52] U.S. Cl. ................................................. 364/200
[58] Field of Search ... 364/200 MS File, 900 MS File

[56] References Cited

U.S. PATENT DOCUMENTS

| 3,508,206 | 4/1970 | Norberg | 364/200 |
|---|---|---|---|
| 3,543,242 | 11/1970 | Adams, Jr. et al. | 364/200 |
| 3,543,246 | 11/1970 | Adams, Jr. | 364/200 |
| 3,643,229 | 2/1972 | Stuebe et al. | 364/200 |
| 3,705,388 | 12/1972 | Nishimoto | 364/200 |
| 3,866,181 | 2/1975 | Gayman et al. | 364/200 |
| 3,866,181 | 2/1975 | Gayman et al. | 364/200 |
| 3,961,312 | 6/1976 | Bodner et al. | 364/200 |

OTHER PUBLICATIONS

Bodner, R. E. et al., "Multiple Class Cycle Steal System", IBM T.D.B., vol. 17, No. 10, Mar. 1975, DS US 049.
Miller, T. H. et al., "Interleaved Cycle Steal Burst Circuitry", IBM T.D.B., vol. 17, No. 9, Feb. 1975, pp. 2732-2735.

Primary Examiner—Raulfe B. Zache
Attorney, Agent, or Firm—Karl O. Hesse

[57] ABSTRACT

An improved I/O interrupt sequencing method and apparatus including generation of an instruction priority request signal to indicate that a real time task requires programmed I/O service. Generating an end of chain signal to suspend burst I/O control of the I/O bus and allow programmed I/O service to a real time device, and resetting the instruction priority request signal to allow burst mode data transfer to continue at the count positions at which it was suspended.

4 Claims, 4 Drawing Figures

I/O INTERRUPT SEQUENCING FOR REAL TIME AND BURST MODE DEVICES

BACKGROUND OF THE INVENTION

The present invention generally relates to data processing systems and more particularly to input/output control associated with real time devices operating on a general purpose data processing system.

At least two types of input/output operations are known in the prior art. In a first type, an I/O program is executed within a computer going through the steps of addressing an I/O device, sending a command to the addressed I/O device to instruct the device to either send or receive data, and either receiving or sending several bytes of data to the I/O device. Usually, the amount of data transferred during one I/O device selection is kept small so that the channel will be available without long delays for receiving interrupt requests from other transfer devices requiring service. During program input/output data transfer, the data passes through the Central Processing Unit (CPU) and is stored in memory by the CPU instruction. Real time devices often use the programmed input/output data transfer method in order that the computer may have immediate access to the data being received. Immediate data access allows immediate response calculation for transmission to the real time device.

Nonreal time devices such as disk memories and tape drives can be more efficiently operated in what is sometimes termed "device initiated burst mode". Device initiated data transfer is initiated by a signal such as cycle steal request being sent from a device to a computer which terminates instruction execution after completion of the currently executing instruction. Upon termination of instruction execution, the computer sends a cycle steal grant response to all I/O devices which are connected in a daisy chain sequence. If two devices require service simultaneously, both will raise a cycle steal request signal but the device with highest priority will receive the cycle steal grant signal first and can inhibit propagation to the lower priority device. Having received the cycle steal grant signal, the disk control logic can place an identifying port address on the data bus, a command indicating whether the device which is to send or receive data and thereafter a single sequential burst of data bytes without intervening address and command information. When in cycle steal mode, data does not pass through the CPU itself, but rather is passed directly to sequential memory addresses under control of an indexing address counter in the selected port of the input/output channel. In addition to the address counter, each port has a byte counter in the associated burst mode device containing the length of the data transfer. As each byte is transferred, the count is decremented. When the count reaches zero, the data transfer has been completed and the burst mode device generates an end of message signal. Each port address counter and byte counter are loaded by programmed instructions prior to the start of any burst data transfer. If the input/output channel is slower than memory, time slots may become available within which the computer can be given access to the memory without interfering with data being transferred by the channel.

It should be noted however, that in spite of the fact that the Central Processor Unit may operate in memory, the Central Processor Unit cannot execute a programmed I/O operation to serve a real time device until the entire burst of data has been transmitted. The burst of data may constitute a single block of 256 or 1,024 bytes requiring significant transmission time and leading to excessive response time for the real time device.

Breaking up the burst into a series of short bursts may allow adequate service to the real time device but seriously impacts burst mode efficiency since the cycle steal request-cycle steal grant sequence must be repeated far more often with small bursts.

A partial solution to this problem is proposed in the prior art by permitting a higher priority device capable of device initiated data transfer to suspend transfer by a lower priority device in the middle of a burst and substitute its own port address, command and/or data sequence. The lower priority device resumes the transmission of its burst upon completion of transmission by the higher priority device. The above described partial solution is incomplete because although a real time device can provide its data into memory, it has no way of receiving a response until all of the lower priority transmitting and suspended bursts have been completed. Until completed, the channel interface is not available for programmed input/output operations by the CPU. Furthermore, the CPU may be unaware of the existence of the real time data in memory since programmed I/O interruptions are inhibited during burst mode channel operations.

SUMMARY OF THE INVENTION

Accordingly, it is a primary object of the invention to provide an improved data transfer method and apparatus particularly suited to the needs of real time devices operating in combination with device initiated burst mode devices on a common I/O interface.

It is a further object of this invention to provide improved burst transmission release mechanism wherein control of the input/output interface can be taken from one device by another device and in turn delegated to the Central Processor Unit.

These and other objects of the invention are accomplished by providing an additional signal path for indicating delegation of control to the Central Processor Unit. Further means are provided within the computer responsive to a delegation signal on the aforementioned signal path to switch control of the input/output interface from the device initiated channel mode to the Central Processing Unit for receiving an interrupt signal from the real time device.

DETAILED DESCRIPTION OF THE PREFERRED EMBODIMENT

The manner in which a preferred embodiment of the present invention is constructed in order to practice the method of the invention will now be described, including its mode of operation which will best be understood in light of the foregoing identified drawings.

Figure 1:
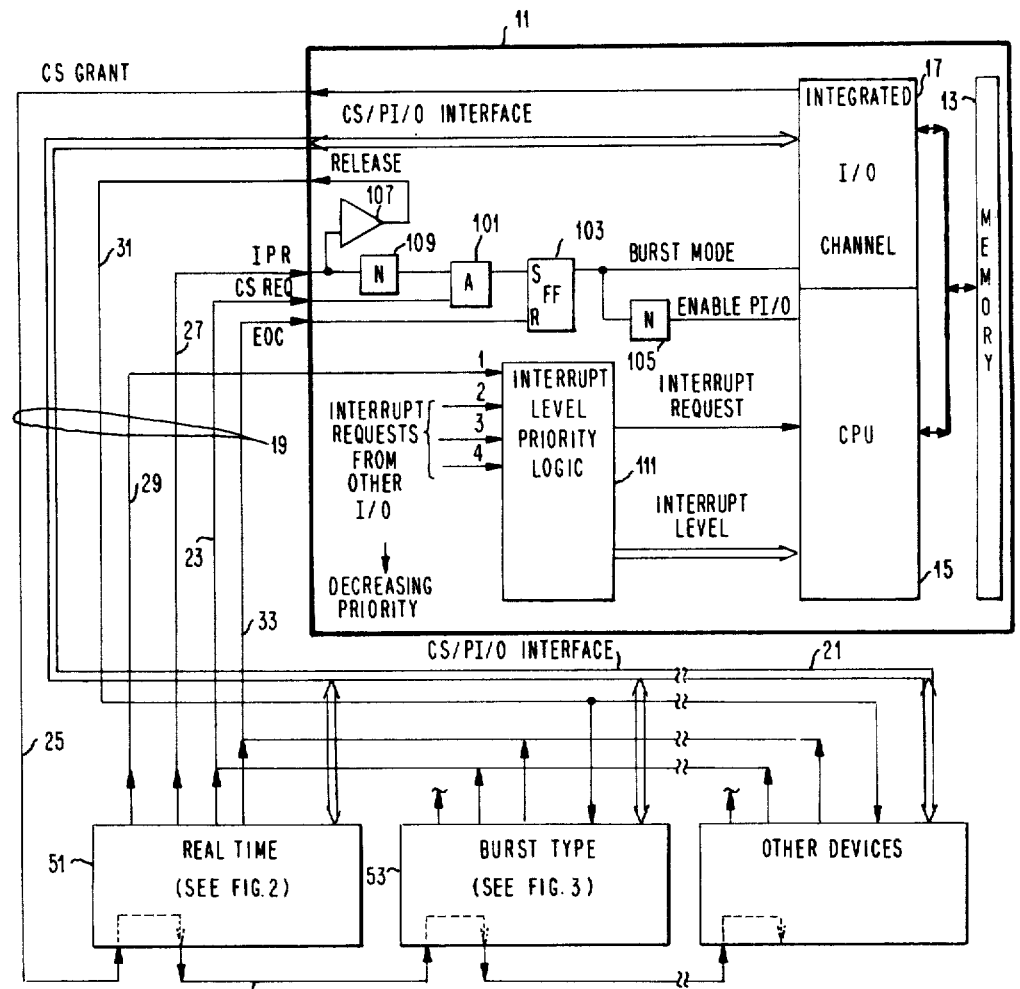
FIG. 1 is a block diagram of input/output devices connected to an input/output bus which is in turn connected to a computer and showing detailed logic of the invention within the computer.

In FIG. 1, a computer 11, including a memory 13, a multiple interrupt level Central Processing Unit 15 and an integrated input/output channel 17 are shown connected to a common input/output bus 19. Common bus 19 includes CS/PIO interface 21 and additional lines of the invention. The interface 21 includes, for example, sixteen data wires and two parity wires for simultaneous parallel transmission of two bytes of data with parity. Interface 21 will also include synchronizing tag lines. These tag lines indicate the content of data on the data wires to be an address, a command, or data and may, for example, be labelled TA, TC and TD. TA indicates, for example, that the information on the data wires is an address, whereas TC and TD indicate that the information is a command or data. The signal lines described above are shown as a single interface cable 21, and are well known to persons skilled in the art of computer architecture. Additional signal lines 23 and 25 relate to device initiated burst mode transmission. Cycle steal request line 23 can be activated by any of the burst type devices which may also be a real time device. Cycle steal request line 23 is an input to AND gate 101 which in turn sets the flip-flop 103. Flip-flop 103 being set signals to integrated I/O channel 17 that a device initiated burst mode data transfer is being requested. When the Central Processing Unit 15 has completed execution of an instruction cycle which may be in progress, control of memory 13 is transferred to integrated I/O channel 17 and a cycle steal grant signal is propagated on line 25 through the I/O devices in a prioritized daisy chain. The burst mode output signal from flip-flop 103 is inverted by inverter 105 to remove the enable programmed I/O signal from the Central Processing Unit 15 thereby inhibiting CPU 15 from executing programmed I/O operations which would conflict with burst mode operations.

In order to suspend burst mode operations and allow programmed I/O operations to resume, an instruction priority request signal can be generated by a real time device 51. For purposes of clarity of explanation, the instruction priority request signal is shown as being sent to computer 11 where it is amplified by amplifier 107 and sent to burst mode devices as a release signal on line 31. It will be recognized by those skilled in the art that the instruction priority request signal could have been sent directly to the burst mode devices without prior amplification by amplifier 107 in computer 11 so long as electrical drive capacities are not exceeded. In addition to being sent to burst mode devices, the instruction priority request signal is inverted by inverter 109 and applied to a second input of AND gate 101 to prevent flip-flop 103 from being set by burst mode devices after it becomes reset by an end of chain signal to be described hereafter.

In response to a real time device having generated an instruction priority request signal, a burst mode device 53 which may be in the midst of a data transfer burst will generate an end of chain signal on line 33 and terminate data transfer. The end of chain signal resets latch 103 which in conjunction with inverter 105 enables programmed I/O operations by Central Processing Unit 15. In conjunction with the return to programmed I/O capability, the real time device would present its interrupt request on line 29 allowing interrupt level priority logic 111 to signal CPU 15 that programmed I/O service is required by real time device 51.

Figure 2:
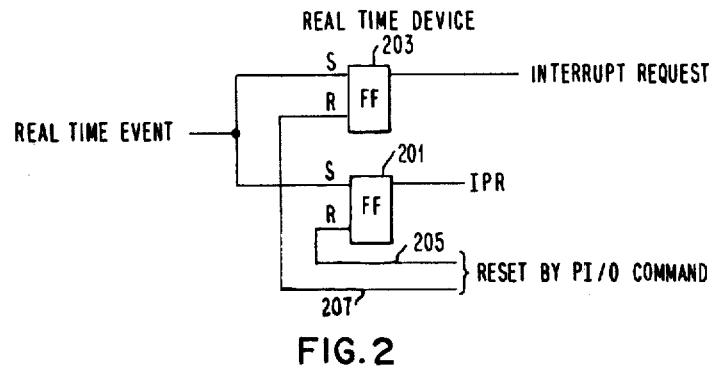
FIG. 2 is a detailed diagram showing logic of the invention within a real time device.

Referring now to FIG. 2, simplified detail logic of the invention is shown responsive to the needs of the real time device and to the system. More particularly, flip-flop 201 has a set input which is connected to an output of a real time event detector such as a voltage comparator, a relay, etc. signalling the need for real time processor intervention. Flip-flop 201 being set provides the instruction priority request signal previously discussed with respect to the signals on wires 27 and 31. In conjunction with the request for immediate programmed I/O service, the real time device also provides its interrupt request via flip-flop 203 to interrupt level priority logic 111. The actual interrupt to CPU 15 will be presented to the internal interrupt circuits of CPU 15 when CPU 15 regains programmed I/O control of the input/output bus 19. Each of flip-flops 201 and 203 are reset by programmed I/O commands from CPU 15 which are decoded by well-known command decode circuitry and applied to reset signal lines 205 and 207 respectively.

Figure 3:
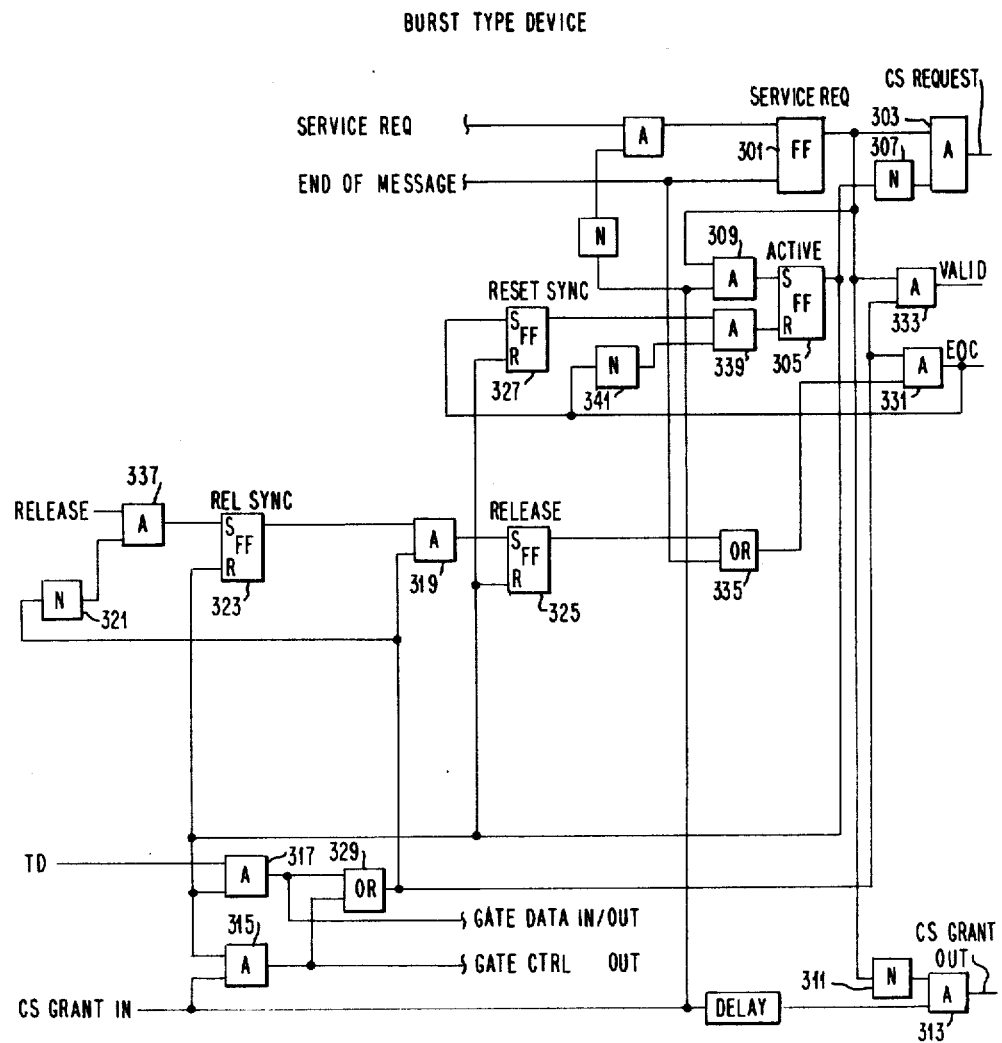
FIG. 3 is a detail circuit diagram of logic in a burst type device for practicing the invention.

Referring now to FIG. 3, those additional circuits of the invention which would be added or changed within a suspendable burst type I/O device such as a disk or tape are shown. By suspendable burst type device, a buffer or other non-overrunable device is to be considered. A burst mode transfer of data is initiated by a condition such as buffer full during a read operation or buffer empty during a write operation. The buffer full or buffer empty operation is recognized as a service request which sets latch 301. Latch 301 being set causes AND gate 303 to propagate a cycle steal request signal onto line 23 of FIG. 1 because at this state active flip-flop 305 has not yet been set and accordingly inverter 307 satisfies the input conditions of AND gate 303. Having generated a cycle steal request, in due course, a cycle steal grant signal will appear and set active flip-flop 305 via AND gate 309. Inputs of AND gate 309 are connected to flip-flop 301, as well as the cycle steal grant input line. Because service request flip-flop 301 is set, inverter 311 having an output connected to AND gate 313 prevents propagation of the delayed cycle steal grant signal to the next lower priority device on bus 19. The output of active flip-flop 305 is connected to inverter 307 as well as AND gates 315 and 317. Additionally, the output of active flip-flop 305 is connected to the reset inputs of flip-flops 323, 325 and 327. AND gate 315 has an output connected to OR gate 329, which is in turn connected to AND gates 319, 331, and 333 as well as inverter 321. AND gate 317 is likewise connected to OR gate 329. The outputs of AND gates 315 and 317 are connected to control and data register gates not shown to transfer control information identifying the burst device channel port number to integrated I/O channel 17, while AND gate 317 transfers data between a buffer or non-overrunable I/O device and memory 13 at the data tag signal time TD. Accompanying each data transfer will be a valid signal on the valid tag line generated by AND gate 333, which has inputs connected to service request flip-flop 301 as well as OR gate 329. If the end of the message is detected, usually by the byte counter value equal to zero, flip-flop 301 is reset while OR gate 335 is conditioned to provide the end of chain output signal via AND gate 331. End of chain indicates to integrated I/O channel 17 that the burst data transfer has been completed. Another input to OR gate 335 receives a signal from release flip-flop 325, which is in turn set by AND gate 319, which is in turn synchronized by flip-flop 323. AND gate 337 has an input for receiving the release signal described earlier as being an amplified instruction priority request signal, which in combination with inverter 321 may set release synch flip-flop 323 between TD signals. The next TD signal sets flip-flop 325. Release latch 325 being set allows AND gate 331 to generate an end of chain signal on line 33 even though normal end of message conditions have not been reached. As previously mentioned, the end of chain signal resets latch 103 in computer 11 thereby terminating the burst mode operation and enabling programmed I/O operation. The end of chain signal also is fed back to set latch 327, which allows AND gate 339 with inverter 341 to reset active flip-flop 305 as soon as the data transfer tag TD signal is removed. Active latch 305 being reset prevents AND gate 315, 317 from further data transmission thereby freeing the bus 19 for use by CPU 15.

OPERATION OF THE PREFERRED EMBODIMENT OF THE INVENTION

With the figures and foregoing description in mind, the operation of the preferred embodiment of the invention will now be described. Before burst mode operation can commence, CPU 15 must load the address counter and byte counter of each port to be used. The address counters are loaded with the starting address of the blocks of memory in memory 13 which are to be involved in burst data transfers through each port. Likewise, a programmed I/O operation will load the channel port number and block size count into a byte counter in each burst mode device. Thereafter as the buffer in a burst mode device becomes either empty when writing or full when reading, a service request is generated internal to the burst mode device causing a cycle steal request for data transfer. This cycle steal request sets burst mode latch 103 which results in integrated I/O channel 17 providing a cycle steal grant signal.

Referring now to FIG. 3, when the cycle steal grant signal is received by AND gate 315, the control word identifying the burst device and including the number of the channel port to be used is gated out to the data bus along with a valid tag signal generated by AND gate 333. Integrated I/O channel 17 of FIG. 1 uses the port number to identify the address counter containing the memory addresses involved in the transfer. Thereafter a continuous sequence of TD data timing pulses, each associated with two bytes of data on the data wires of I/O bus 19. Each TD signal control AND gate 317 of FIG. 3 to pass the data either into or out of burst device 53 and to increment the data counter. When the buffer has been emptied during a read operation or filled during write operation, an end of message is provided to rest service register 301 and generate an end of chain signal through OR gate 335 via AND gate 331.

The foregoing description followed the operation of the circuits of the preferred embodiment while transmitting a single uninterrupted burst of data.

When a real time device 51 requires service, the latches 201 and 203 in FIG. 2 are set by the real time event detected within the device. Latches 201 and 203 generate instruction priority request and interrupt request signals respectively on lines 27 and 23 of bus 19. The instruction priority request signal is inverted by inverter 109 to inhibit AND gate 101 and thereby prevent setting burst mode latch 103 if it has not already been set. In the event that it is already set, it will be reset by end of chain signal from the burst transferring device.

Figure 4:
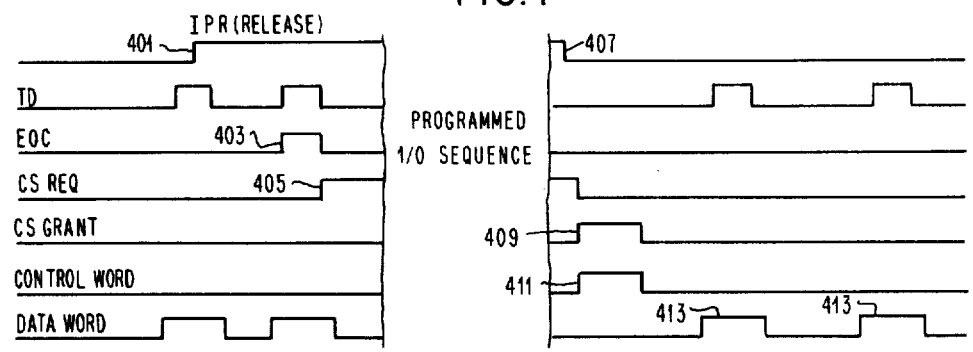
FIG. 4 is a timing diagram showing a programmed I/O operation during a suspended burst I/O operation.

Referring now to FIG. 4, the sequence of an instruction priority request causing a programmed I/O sequence to suspend on executing burst mode data transfer will be described with the other figures in mind. As shown in the first waveform, instruction priority request (IPR) 401 is raised asynchronously when the real time device first requires service. Having raised the instruction priority request line, the release input via AND gate 337 sets release sync latch 323 at the end of the TD pulse. Latch 323 being set in turn causes release latch 325 to be set at the beginning of the next TD pulse. The output of release latch 325 foces an end of chain signal 403 via gates 335 and 331. The end of chain signal from AND gate 331 causes flip-flop 327 to be set which in turn resets active flip-flop 305 when the end of chain signal falls with TD. Active latch 305 being reset allows inverter 307 to cooperate with service request register 301 which remains set to create a cycle steal request 405 which will remain active throughout the following programmed I/O sequence and reestablish the burst data transfer thereafter.

Burst data transfer is re-established when the programmed I/O instruction resets flip-flop 201 thereby removing the instruction priority request signal 407 and allowing a cycle steal grant 409 to be generated by integrated I/O channel 17. The cycle steal grant signal anded with the output of service register flip-flop 301 at AND gate 309 to again set active flip-flop 305. Active flip-flop 305 being set in combination with the cycle steal grant input signal causes the control word 411 identifying the port being used to again be gated out on the data lines. When the control word is received by integrated I/O channel 17, it drops the signal on the cycle steal grant line and begins transmitting data timing pulses TD which are thereafter associated with each pair of data bytes 413 transferred.

While the invention has been particularly shown and described with reference to a preferred embodiment thereof including an integrated channel, it will be understood by those skilled in the art that various changes in form and detail including use of a separate I/O channel or the substitution of parallel cycle steal grant priority determination logic may be made therein without departing from the spirit and scope of the invention.

Having thus described our invention, what we claim as new, and desire to secure by Letters Patent is:

1. In computer input/output apparatus adapted to operate in either device initiated burst mode, or programmed I/O mode, an improved interrupt sequencing apparatus comprising:

means in a first device attached to said input/output apparatus for generating an instruction priority request signal thereby indicating to said computer that immediate programmed I/O service is required and requesting a second device attached to said input/output apparatus to suspend a burst data transfer in progress;

means in said second device for generating an end of chain signal to said computer to indicate suspension of burst data transfer;

means in said computer responsive to said end of chain signal to switch said input/output apparatus to programmed I/O operation;

means in said first device responsive to a programmed I/O instruction for permitting device initiated burst mode data transfers to resume.

2. The input/output apparatus of claim 1 wherein said computer further comprises:
means responsive to said instruction priority request signal to inhibit initiation of a higher priority burst mode data transfer.

3. The input/output apparatus of claim 1 further comprising:
said means in said first device responsive to said programmed I/O instruction including means to terminate said instruction priority request signal, and;
means in said computer responsive to said termination of said instruction priority request signal for generating a grant signal to said second device permitting said second device to resume burst mode data transfer.

4. The method of suspending a burst mode device initiated data transfer on a computer input/output channel for programmed I/O device of a programmed I/O device comprising the steps of:
generating an instruction priority request signal in said programmed I/O device;
transmitting said instruction priority request signal to said burst mode device;
generating a premature end of chain signal in said burst mode device in response to said instruction priority request;
transmitting said end of chain signal to said computer;
switching said input/output channel from burst mode to programmed I/O mode;
terminating said instruction priority request signal thereby allowing the suspended burst mode data transfer to resume.

* * * * *